United States Patent [19]

Nakauchi

[11] 4,382,291

[45] May 3, 1983

[54] SURVEILLANCE SYSTEM IN WHICH A REFLECTED SIGNAL PATTERN IS COMPARED TO A REFERENCE PATTERN

[75] Inventor: Shunsaku Nakauchi, Mitaka, Japan

[73] Assignee: Secom Co., Ltd., Tokyo, Japan

[21] Appl. No.: 198,114

[22] Filed: Oct. 17, 1980

[51] Int. Cl.³ .............................................. G08B 13/16
[52] U.S. Cl. ...................................... 367/93; 340/552; 340/555; 343/5 PD
[58] Field of Search .............. 367/93; 340/552, 555; 343/5 PD

[56] References Cited

U.S. PATENT DOCUMENTS

| | | |
|---|---|---|
| 3,825,676 | 7/1974 | Ramsden, Jr. .................. 390/555 |
| 3,967,283 | 6/1976 | Clark et al. .................... 343/5 PD |
| 3,987,427 | 10/1976 | Clift ............................. 343/5 PD |
| 4,016,529 | 4/1977 | Inuzuka et al. ................. 367/93 |
| 4,028,690 | 6/1977 | Buckley et al. ................. 340/552 |
| 4,131,872 | 12/1978 | Inoue et al. .................... 367/93 |
| 4,142,188 | 2/1979 | Zetting et al. .................. 367/93 |

*Primary Examiner*—Glen R. Swann, III
*Attorney, Agent, or Firm*—Armstrong, Nikaido, Marmelstein & Kubovcik

[57] ABSTRACT

Radiation energy is emitted intermittently to an area under surveillance and a pattern of reflections is formed. Thereafter, the pattern of reflections is statistically compared with a reference pattern which is prepared in advance. When the two patterns are different, an alarm is activated.

6 Claims, 5 Drawing Figures

SURVEILLANCE SYSTEM IN WHICH A REFLECTED SIGNAL PATTERN IS COMPARED TO A REFERENCE PATTERN

BACKGROUND OF THE INVENTION (1) Field of the Invention

The present invention relates to a surveillance system and, more particularly, to a surveillance system utilizing radiation such as ultrasonic waves.

(2) Prior Art of the Invention

In recent years, radiation such as ultrasonic waves has been utilized in a surveillance system which generates an alarm signal when an unauthorized person enters into an area under surveillance.

One conventional surveillance system utilizes Doppler effect. According to this system, ultrasonic waves having a predetermined frequency are continuously launched into an area under surveillance which may be in a room, and when frequency components different from said predetermined frequency are detected in reflections by objects in the area under surveillance, the presence of an unauthorized person in the area under surveillance is detected so that an alarm such as a buzzer is energized. That is, such a system utilizes Doppler effect in which the frequency of reflections by an object which approaches an ultrasonic wave emitter increases, while the frequency of an object which moves away from the ultrasonic wave emitter decreases.

However, in the above-mentioned conventional system, when the air, in the area under Surveillance changes due to the presence of a draft, the operation of an air conditioner or the like, an object, such as a curtain, is swayed, the alarm may be activated. Therefore, in order to prevent the alarm from being erroneously operated, special circuits which are complex and costly are required. In addition, the detection sensibility of a receiver must be adjusted in accordance with the conditions of an area under surveillance. Furthermore, it is difficult for an area under surveillance to be established out in the open in which there may be many various kinds of noises.

SUMMARY OF THE INVENTION

It is a principal object of the present invention to provide a surveillance system capable of being reliably operated even when the air in the area under surveilance changes.

It is another object of the present invention to provide a surveillance system which requires no adjustment of the detection sensibility in accordance with the conditions of an area under surveillance.

It is still another object of the present invention to provide a surveillance system which can be used in an area under surveillance established out in the open.

According to the present invention, there is provided a surveillance system for detecting an unauthorized object or person in an area under surveillance, comprising: means for transmitting a radiation energy signal, intermittently, to the area under surveillance; means for receiving reflections from the area under surveillance and converting analog signals of the reflections into digital signals; means, connected to the receiving means, for storing the digital signals for a predetermined time; means, connected to the storing means, for forming a reference pattern from the digital signals stored in the storing means; and means, connected to the receiving means and the reference pattern forming means, for comparing a pattern of reflections from the receiving means with the reference pattern of the reference pattern forming means and for activating an alarm when the pattern of reflections and the reference pattern are different.

The present invention will be more clearly understood from the description as set forth below with reference to the accompanying drawings.

DESCRIPTION OF THE PREFERRED EMBODIMENT

Figure 1:
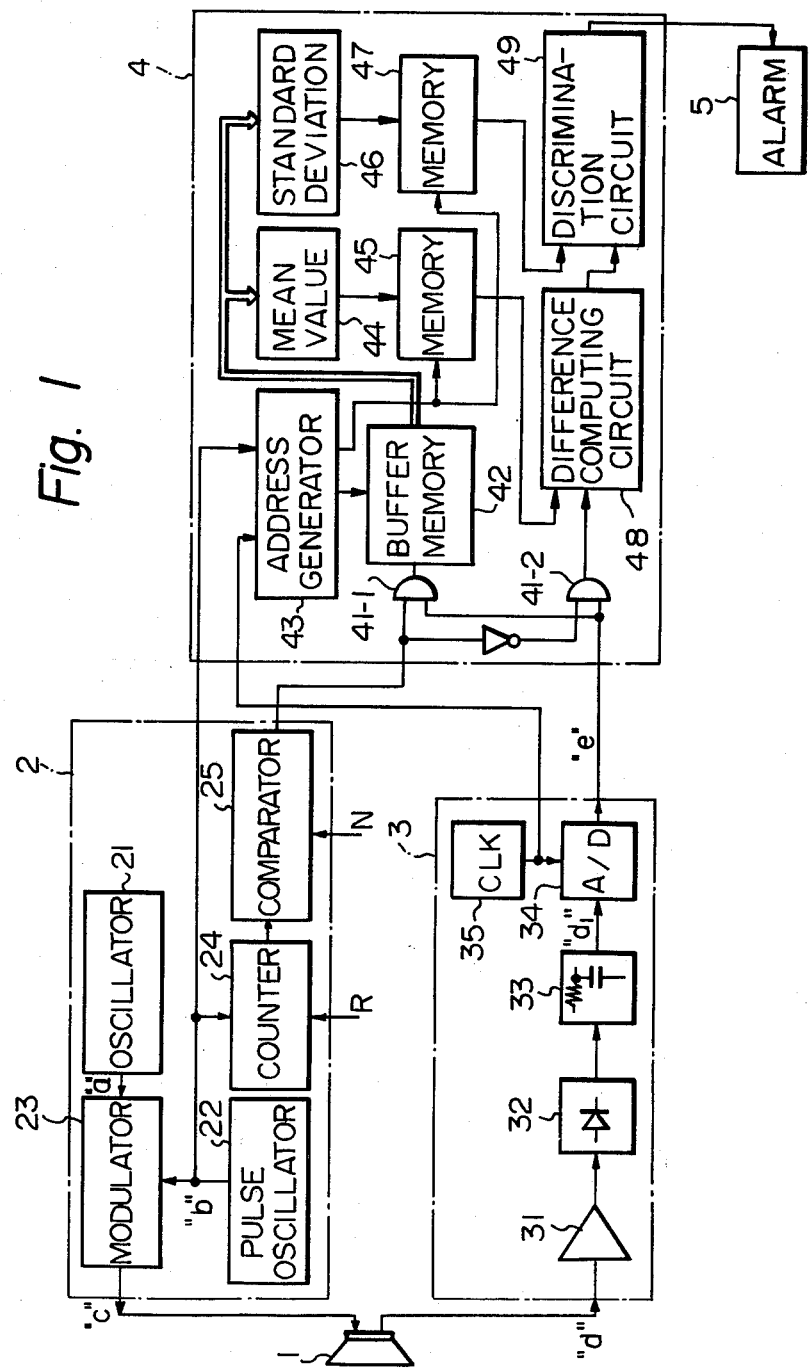
FIG. 1 is a block circuit diagram illustrating an embodiment of the surveillance system according to the present invention.

Referring to FIG. 1, which illustrates an embodiment of the surveillance system according to the present invention, the transmitting operation of an ultrasonic emitter-receiver (hereinafter referred to as an ultrasonic element) 1 is controlled by a transmitter circuit 2. Ultrasonic waves emitted from the ultrasonic element 1 are reflected by desks, shelves and walls in an area under surveillance, and are again received by the ultrasonic element 1. The reflections which are received by the element 1 are converted into digital signals by a receiver circuit 3, and are transmitted to an operation processing circuit 4. In the operation processing circuit 4, a reference pattern is prepared in advance based on patterns of reflections collected by the receiver circuit 3, and when an area is under surveillance, a pattern of reflections responsive to the conditions in the area under surveillance is compared statistically with the reference pattern. When the two patterns are statistically different, the operation processing circuit 4 energizes an alarm 5 such as a buzzer.

FIGS. 2A through 2D are timing diagrams of the signals appearing in the circuit of FIG. 1. Referring to FIGS. 2A through 2D, the circuit of FIG. 1 will now be explained in more detail.

Figure 2A:
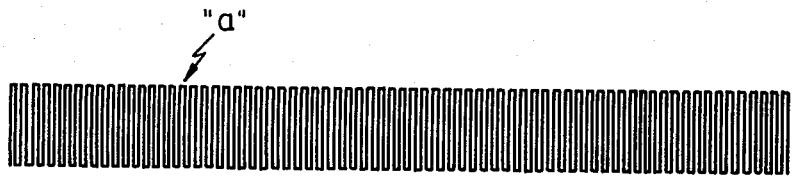
FIGS. 2A through 2D are timing diagrams of the signals appearing in the circuit of FIG. 1.
Figure 2B:
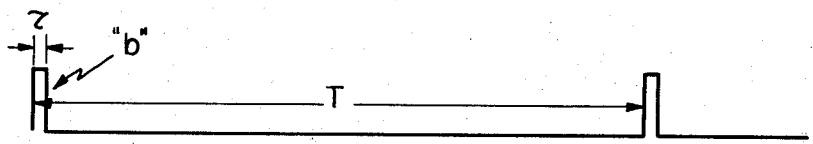
Figure 2C:
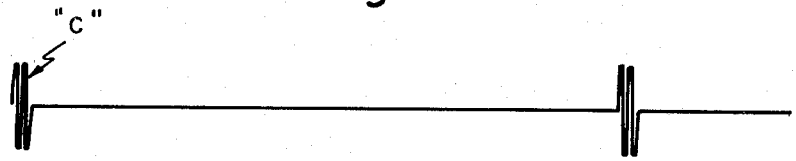

In the transmitter circuit 2, an oscillator 21 generates a signal "a" the frequency of which is, for example, 25 through 50 kHz, as illustrated in FIG. 2A, and a pulse oscillator 22 generates a pulse-shaped signal "b" having a repetition period T of the order of, for example, 100 milliseconds and a duration time $\tau$ of the order of, for example, several milliseconds, as illustrated in FIG. 2B. Therefore, a modulator 23 transmits a signal "c", as illustrated in FIG. 2C, to the ultrasonic element 1, so that the ultrasonic element 1 emits ultrasonic waves intermittently, that is, pulse-shaped ultrasonic waves, towards the area under surveillance. The ultrasonic waves are reflected by desks, shelves and walls in the area under surveillance. A large number of reflections are superposed and are again received by the element 1 which, in turn, generates an electrical signal "d".

In the receiver circuit 3, the signal "d" is amplified by an amplifier 31 and, after that, is rectified by a rectifier 32 for amplitude-modulated detection. In addition, an output signal of the rectifier 32 is smoothed by a smoothing circuit 33 to form signal "$d_1$" which is converted into a digital signal "e" by an analog/digital converter 34. In the analog/digital converter 34, the analog signal "$d_1$" is sampled by using clock pulses generated from a clock oscillator 35.

The operation processing circuit 4 comprises a buffer memory 42 for storing the digital signals "e", an address generator 43 for indicating an address location of the buffer memory 42. In addition, the circuit 4 comprises a mean value calculator circuit 44 for calculating mean values of data stored in the buffer memory 42 at each sampling point and a memory 45 for storing the calculated results by the circuit 44, which results form a mean value pattern as a reference pattern. Further, the circuit 4 comprises a standard deviation calculator circuit 46 for calculating standard values of data stored in the buffer memory 42 at each sampling point and a memory 47 for storing the calculated results by the circuit 46, which results form a standard deviation pattern as a reference pattern. That is, the reference pattern includes two patterns, i.e., the mean value pattern and the standard deviation pattern. It should be noted that a reference pattern forming means is comprised of the elements 44 through 47.

Furthermore, the operation processing circuit 4 comprises a comparing means which is comprised of a difference computing circuit 48 and a discrimination circuit 49. The difference computing circuit 48 calculates a difference between a first digital value of the signal "e" and a second digital value stored in the memory 45 the address location of which corresponds to the sampling point of the first digital value and is indicated by the address generator 43. The discrimination circuit 49 compares the value of the difference computing circuit 48 with a third digital value stored in the memory 47 the address location of which also corresponds to said sampling point. When the absolute value of the difference value is larger than the third digital value, the circuit 49 energizes the alarm 5.

The formation of a reference pattern will now be explained based upon reflections in accordance with the area under surveillance when there is no person present. First, a counter 24 of the transmitter circuit 2 is reset by a reset signal R, so that the counter 24 begins to count pulses of the signal "b" generated from the pulse oscillator 22. The value of the counter 24 is compared with a predetermined value N by a comparator 25. In this case, when the value of the counter 24 is smaller than the predetermined value N, the comparator 25 generates a high potential signal, while, when the value of the counter 24 is equal or larger than the predetermined value N, the comparator 25 generates a low potential signal. As a result, in the operation processing circuit 4, gates 41-1 and 41-2 are opened and closed, respectively, with regard to the digital signal "e" from the receiver circuit 3 for a predetermined period of time after the counter 24 of the transmitter circuit 2 is reset. Therefore, the data of the digital signal "e" is stored via the gate 41-1 in the buffer memory 42 at an address location indicated by the address generator 43 which is controlled by the pulse oscillator of the transmitter circuit 2 and by the clock oscillator 35 of the receiver circuit 3. Thus, a plurality of patterns of reflections of a predetermined number of samples are stored in the buffer memory 42. The operation for storing patterns is completed when the value of the counter 24 has reached the predetermiend value. Thereafter, mean values of the data stored in the buffer memory 42 are calculated by a mean value calculator circuit 44 for each smapling point, and the calculated results are stored in the memory 45. In addition, standard deviation values of the data stored in the buffer memory 42 are calculated by a standard deviation calculator circuit 46 for each sampling point, and the calculated results are stored in the memory 47.

It should be noted that the above-mentioned reference patterns can be renewed at any time when a reset signal R is applied to the counter 24 of the transmitter circuit 2.

Figure 2D:

On the other hand, when an area is under surveilance, the gates 41-1 and 41-2 are closed and opened, respectively, for the digital signal "e", since the comparator 25 generates a high potential signal. Therefore, the digital signal "e" is supplied to an input of the difference computing circuit 48 via the gate 41-2, while another input of the circuit 48 is supplied with a mean value stored at a corresponding address location of the memory 45 which is indicated by the address generator 43. The difference between the two values is compared with a standard deviation value stored at a corresponding address location of the memory 47 which is also indicated by the address generator 43. When the difference is equal or larger than the standard deviation value, the discrimination circuit 49 energizes the alarm 5. Thus, when the pattern of reflection is statistically different from the reference pattern, the alarm 5 is energized. For example, as illustrated in FIG. 2D in which a solid line represents the reference pattern (mean value pattern), the alarm 5 is energized when a portion indicated by an arrow X or Y is present in the pattern of reflections due to the presence of an unauthorized person who enters in the area under surveillance.

In the above-mentioned embodiment, ultrasonic waves are used. However, it should be noted that other radiation energy signals such as sonic waves or electromagnetic waves including light can be used. For example, in case of sonic waves, a phone generator and a phone receiver can be used instead of the ultrasonic emitter-receiver 1. In addition, in case of light, photodiodes or phototransistors can be used instead of the ultrasonic emitter-receiver 1.

Further, in the above-mentioned embodiment, a reference pattern is unchangeable unless a reset signal R is supplied to the counter 24. However, the reference pattern can be periodically renewed based on a predetermined number of new patterns. In this case, the counter 24, the comparator 25 the gates 41-1 and 41-2 are omitted so that the data stored in the buffer memory 42 are also periodically renewed.

The surveillance system according to the present invention has such advantages, as compared with the conventional system, that the system can be reliably operated even when the air in the area under surveillance fluctuates; adjustment of the detection sensibility is unnecessary; and the system can be reliably operated even out in the open air. This is because a reference pattern including a mean value pattern and a standard deviation pattern is formed in accordance with the conditions in an area under surveillance. For example, when the fluctuation of the air in the area under surveillance is large or the area under surveillance is established in the open air, standard deviation values in the reference pattern are relatively large.

I claim:

1. A surveillance system for detecting an unauthorized object or person in an area under surveillance, comprising:

means for transmitting a radiation energy signal, intermittently, to said area under surveillance;

means for receiving reflections from said area under surveillance and converting analog signals of said reflections into digital signal patterns;

means, connected to said receiving means, for storing a plurality of said digital signal patterns for a predetermined time;

means, connected to said storing means, for forming a reference pattern from said plurality of stored digital signal patterns in said storing means; and means, connected to said receiving means and said reference pattern forming means, for comparing a digital signal pattern from said receiving means with said reference pattern of said reference pattern forming means and for activating an alarm when said digital signal pattern and said reference pattern are different.

2. A system as set forth in claim 1, wherein said radiation energy signal is an ultrasonic wave signal.

3. A system as set forth in claim 1, wherein said radiation energy signal is a sonic wave signal.

4. A system as set forth in claim 1, wherein said radiation energy signal is an electromagnetic wave signal.

5. A system as set forth in claim 4, wherein said electromagnetic wave signal is a light signal.

6. A system as set forth in claim 1, wherein said reference pattern forming means comprises means for forming a mean value pattern from said digital data stored in said storing means, and means for forming a standard deviation pattern from said data stored in said storing means, whereby said reference pattern is comprised of said mean value pattern and said standard deviation pattern.

* * * * *